United States Patent
Horng et al.

(10) Patent No.: US 6,515,447 B2
(45) Date of Patent: Feb. 4, 2003

(54) FAN MOTOR WITH VARIABLE FREQUENCY/CONSTANT SPEED CONTROL

(75) Inventors: Alex Horng, Kaohsiung (TW); Nan Long Tsai, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/781,971

(22) Filed: Feb. 14, 2001

(65) Prior Publication Data
US 2002/0109478 A1 Aug. 15, 2002

(51) Int. Cl.$^7$ ................................................ H02P 5/28
(52) U.S. Cl. ........................ 318/807; 318/254; 318/138; 318/439; 318/473; 388/934
(58) Field of Search ................................. 318/807, 254, 318/138, 439, 473; 388/934

(56) References Cited

U.S. PATENT DOCUMENTS 5,197,858 A  3/1993  Cheng
5,300,866 A * 4/1994  Yasohara et al. ........... 318/254
5,942,866 A  8/1999  Hsieh

* cited by examiner

Primary Examiner—Karen Masih
(74) Attorney, Agent, or Firm—Bacon & Thomas

(57) ABSTRACT

A fan motor with variable frequency/constant speed control comprises a frequency comparator, a differential integrating circuit, and a differential amplifier. The frequency comparator calculates a frequency difference between a frequency of an external pulse signal input and a frequency of a speed signal detected from the fan. The differential integrating circuit converts the frequency difference into a voltage signal which is inputted to a negative terminal of the differential amplifier. A predetermined voltage is connected to a positive terminal of the differential amplifier. A voltage value at the negative terminal of the differential amplifier is compared with a voltage value at the positive terminal of the differential amplifier to thereby change a voltage outputted to an input end of the fan.

5 Claims, 4 Drawing Sheets

FAN MOTOR WITH VARIABLE FREQUENCY/CONSTANT SPEED CONTROL

BACKGROUND OF THE INVENTION

1. Field of the Invention

The present invention relates to a fan motor with variable frequency/constant speed control, and more particularly to a fan motor which compares a signal frequency of an input pulse with a frequency of a signal detected from a fan and then varies an output voltage by a differential integrating circuit and a differential amplifier, such that the output voltage outputted to the fan has a smooth waveform, thereby saving electricity and precisely keeping the fan operate at a constant speed. Longevity of the fan is lengthened accordingly.

2. Description of the Related Art

A conventional fan motor is shown in FIG. 1 and FIG. 2 (including FIGS. 2A–2C) of the drawings that correspond to FIG. 2 and FIG. 5 (including FIGS. 5A–5C) of U.S. Pat. No. 5,197,858 to Cheng issued on Mar. 30, 1993. FIG. 1 is a circuit diagram of a controller for the fan. FIG. 2 illustrates the output waveforms for the drive IC of the circuit. As illustrated in FIG. 1, when the power is on, via an inverse voltage protection diode D1, impellers start to rotate by mutual induction between winding coils and magnet. At this time, a Hall element IC1 senses the variation of magnetic field between winding and magnet to cause the DC brushless motor to commute as follows: A predetermined current and DC level are supplied by resistors R3, R2. Positive (V+) and negative (V−) voltages are both output from the Hall element IC1 to a driving integrating circuit IC2. The two voltage waveforms can be shaped by means of the driving integrating circuit IC2 by comparing them with an internal voltage to obtain the waveform shown in FIG. 2A. This waveform controls semiconductor switches A1 and A2 to obtain the waveform shown as FIGS. 2B and 2C. Motor windings L1, L2, L3, and L4 are controlled by the wave output from the semiconductor switches A1, A2 to commutate in accordance with the magnetic couple with magnet. The capacitor C1 provides voltage to the driving integrating circuit IC2 for re-starting of the motor from a completely motionless state of the fan. As a result, a driving system composed of IC1 and IC2 can drive the fan and output a cycle-timing pulse signal.

IC3 comprises three internal operational amplifiers IC31, IC32, IC33. Operational amplifiers IC31, with resistors R4, R5, R6, R7, R8, R9, R10 and a thermal sensor Rth in combination, forms a control circuit for the slope of the curve of the speed versus the temperature of the thermal control variable speed fan. Because the resistance value of the thermal sensor Rth changes with temperature, the voltage Vth which is dependent upon the resistance of sensor Rth and resistor R4 will also be changed as the temperature changes. Voltage Vth and the reference voltage Vref, which is controlled by the voltage divider formed ho by resistors R9 and R10, are input into operational amplifier IC31, to obtain a variable voltage Vo, which causes the collector current of transistor TR1 to change accordingly, changing the speed of the fan. Therefore, the object of the variable speed by thermal control is achieved.

Nevertheless, the waveforms output from the drive integrating circuit IC2 to the windings L1, L2, L3, and L4 are rectangular waveforms, as shown in FIGS. 2B and 2C. In addition, although the change in the output voltage Vb by the operational amplifier IC31 in response to change in the environmental temperature make a change in the conductive current in the transistor TR2, output waveforms of the transistor TR2 are still rectangular waveforms. Thus, rotating speed of the fan is increased or reduced suddenly due to rectangular waveforms inputted to the windings L1, L2, L3, and L4. As a result, the fan wobbles and thus has a shortened longevity.

Another conventional fan motor is shown in FIGS. 3 and 4 of the drawings that correspond to FIG. 2 and FIG. 3 of U.S. Pat. No. 5,942,866 to Hsieh issued on Aug. 24, 1999. FIG. 3 is a schematic block diagram of a control circuit. FIG. 4 shows the voltage signal outputted from a switching device of the control circuit. As illustrated in FIG. 3, a control circuit 10 for a DC brushless fan comprises a rectifying circuit 20, a comparator 21, and a switching device 22. The rectifying circuit 20 receives a continuous, rectangular wave signal from the fan 23, which is indicative of the rotating speed of the fan 23, and then sends a rectified and filtered DC voltage signal V1 to inverted input terminal of the comparator 20. The non-inverted input terminal of the comparator 21 is connected to a reference voltage signal Vref, which is used for setting the rotating speed of the fan 23, and the output terminal of the comparator 21 is connected to the switching device 22. The switching device 22 may be a transistor or an equivalent electronic switch that is serially connected between a source voltage Vcc and the source terminal of the fan 23. The operation of the switching device 22 depends on the compared result of the rectified DC voltage signal V1 outputted from the rectifying circuit 21 and the reference voltage signal Vref.

When the DC voltage signal V1 outputted from the rectifying circuit 21 is lower than the reference voltage signal Vref, i.e., the rotating speed of the fan 23 is lower than its setting value, the comparator 21 outputs a Logic high value to the switching device 22. Then, the switching device 22 is closed, and the fan 23 is powered on. Thus, rotating speed of the fan 23 will be increased.

In contrast, when the DC voltage signal outputted from the rectifying circuit 20 is higher than the reference voltage signal Vref, i.e., the rotating speed of the fan 23 is higher than its setting value, the comparator 21 outputs a Logic low value to the switching device 22. Then, the switching device 22 is opened, and the fan 23 is powered off. Thus, rotating speed of the fan 23 will be decreased.

In operation, the switching device 22 is repeatedly closed and opened as the rotating speed of the fan varies, thus the fan is intermittently powered on, whereby the rotating speed of the fan 23 can be controlled and kept at a constant value. As illustrated in FIG. 4, the output signal of the switching device 22 is an intermittently opened and closed rectangular wave, where the period (TIME ON) during which the switching device 22 is closed and the period (TIME OFF) during which the switching device 22 is opened are modulated so as to control the rotating speed of the fan 23.

Nevertheless, the output waveform is an intermittently opened and closed rectangular waveform, and the rotating speed of the fan 23 is increased or decreased suddenly in response to opening or closing of the rectangular waveform or the switching device 22. As a result, the fan wobbles and thus has a shortened longevity.

SUMMARY OF THE INVENTION

In view of the above drawbacks, the present invention provides a fan motor which compares a signal frequency of an input pulse with a frequency of a signal detected from a fan and then uses a differential integrating circuit and a differential amplifier to calculate the difference between the two frequencies. The difference is converted into a voltage signal which is then added to or subtracted from a predetermined voltage. The resultant voltage is connected to a voltage input end of the fan to thereby change the input voltage for the fan. Thus, the speed of the fan is increased or decreased gradually to avoid sudden change in the fan speed. Longevity of the fan is lengthened and the speed of the fan is kept at a constant value.

Accordingly, it is the primary object of the present invention to provide a fan motor which compares a signal frequency of an input pulse with a frequency of a signal detected from a fan and then varies an output voltage by a differential integrating circuit and a differential amplifier, such that the output voltage outputted to the fan has a smooth waveform. Electricity is saved and the fan is precisely kept at a constant speed during operation. Longevity of the fan is lengthened accordingly.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENT

A preferred embodiment in accordance with the present invention will now be described with reference to the accompanying drawings.

Figure 1:
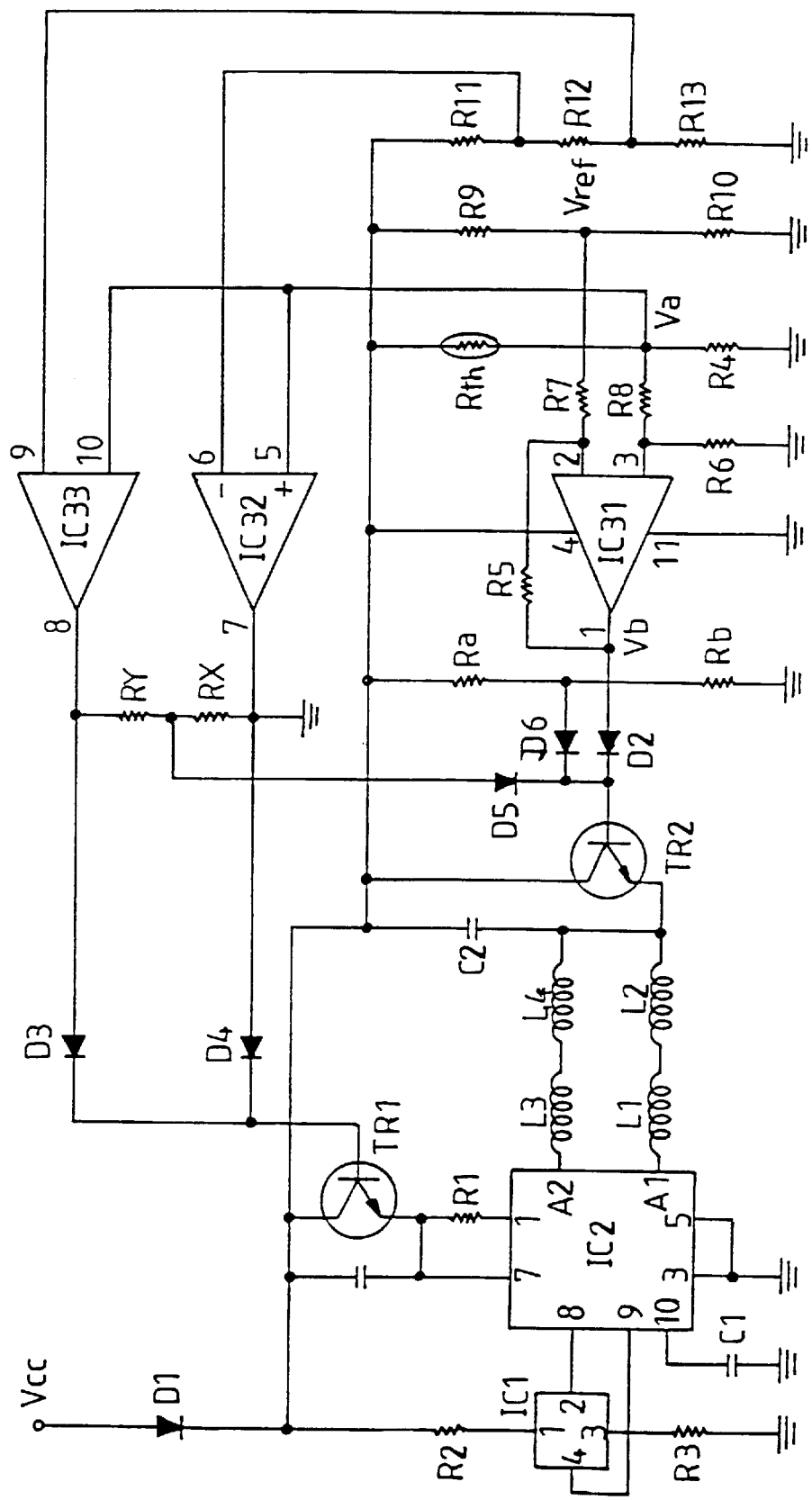
FIG. 1 is a circuit diagram of a conventional controller for a fan.
Figure 2:
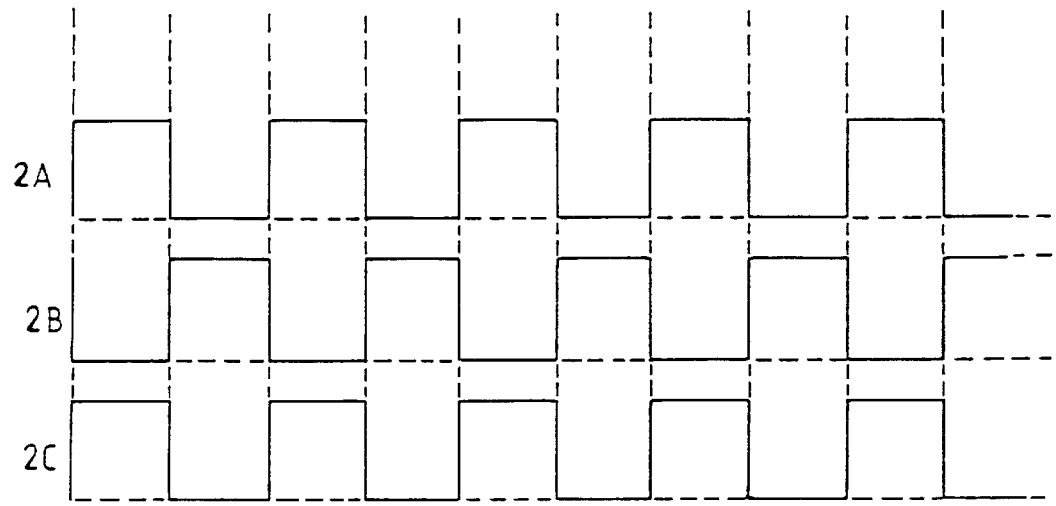
FIG. 2 is a diagram illustrating the output waveforms for the drive IC of the circuit in FIG. 1.
Figure 3:
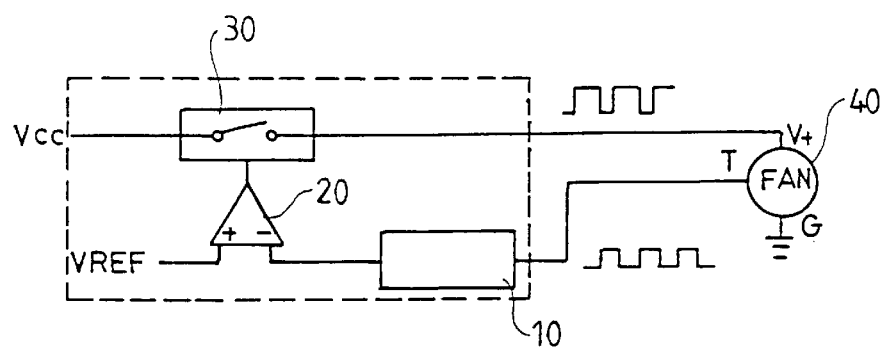
FIG. 3 is a schematic block diagram of another conventional control circuit.
Figures 4, 5:
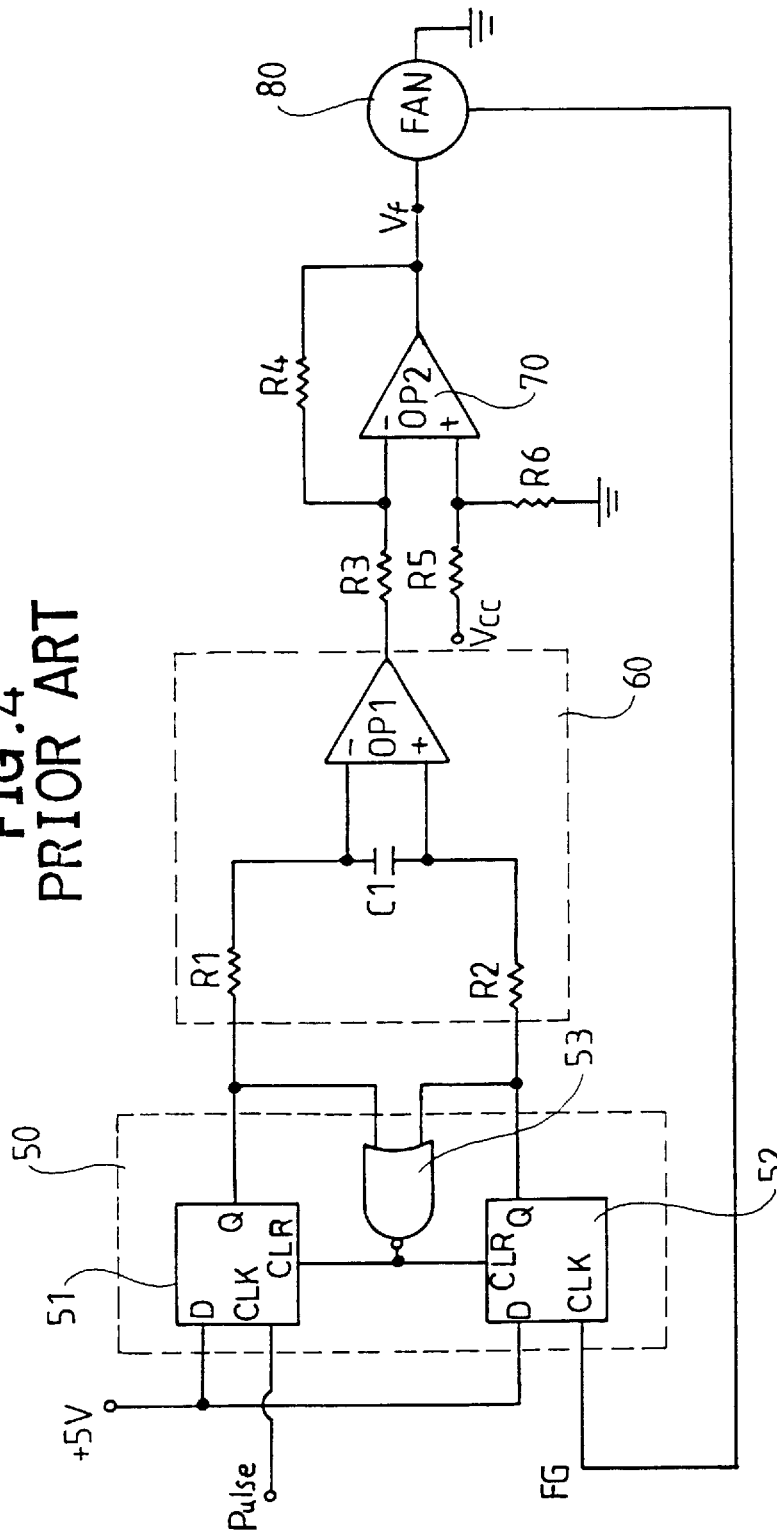
FIG. 4 shows the voltage signal outputted from a switching device of the control circuit in FIG. 3.
FIG. 5 is a diagram of a circuit for a fan motor in accordance with the present invention.

Referring to FIG. 5, a fan motor in accordance with the present invention generally includes a frequency comparator 50, a differential integrating circuit 60, and a differential amplifier 70 (OP2). The frequency comparator 50 includes a first flip-flop 51, a second flip-flop 52, and a reverse AND gate 53. An external pulse (see Pulse in FIG. 5) is inputted to the first flip-flop 51 of the frequency comparator 50, and a speed signal FG detected by a drive circuit for a fan 80 is inputted to the second flip-flop 52 of the frequency comparator 50. Upon reception of the two signal frequencies, each of the first flip-flop 51 and the second flip-flop 52 outputs a frequency signal to the differential integrating circuit 60.

The differential integrating circuit 60 includes a first resistor R1, a second resistor R2, a capacitor C1, and a voltage comparator OP1. The detected frequency is converted into a voltage signal which is then inputted to a negative terminal of the differential amplifier 70. A partial voltage of a power source Vcc is inputted to a positive terminal of the differential amplifier 70. The differential amplifier 70 calculates the sum of or difference between the voltage value at the negative terminal and the voltage value at the positive terminal to obtain an input voltage Vf (drive voltage) for an input end of the fan 80, Namely, the voltage Vf inputted to the input end of the fan 80 may be varied according to the operation signal detected from the fan 80, thereby keeping the fan 80 at a constant speed.

Thus, the present invention compares a signal frequency of an input pulse with a frequency of a signal detected from a fan for controlling the speed of the fan 80. In addition, the fan speed is increased or decreased gradually such that the fan operates smoothly while changing its speed to thereby lengthen longevity of the fan.

Figure 6A:
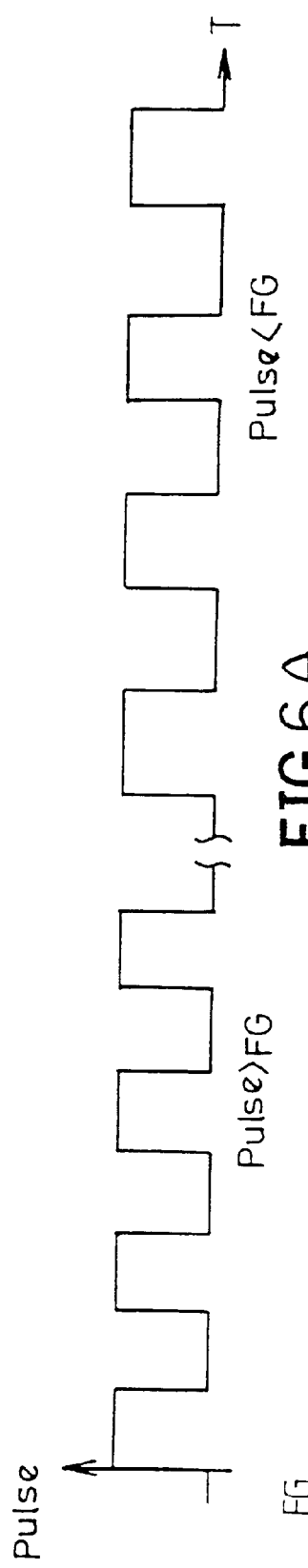
FIGS. 6A, 6B, and 6C are schematic views respectively illustrating waveforms of an input pulse, a fan speed signal, and a drive voltage of the fan motor in accordance with the present invention.
Figure 6B:
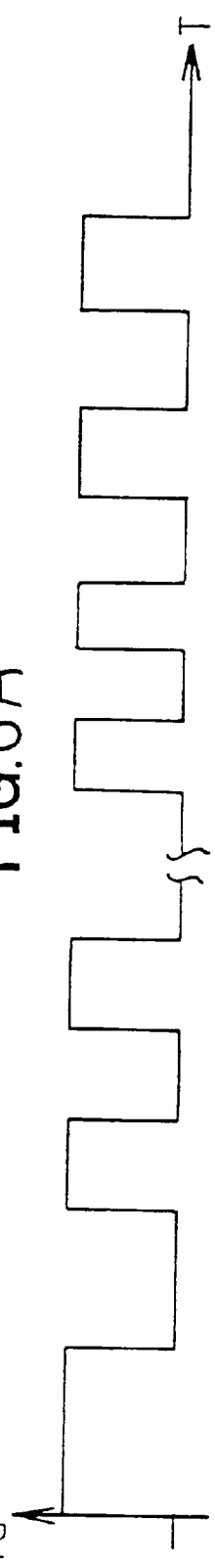
Figure 6C:
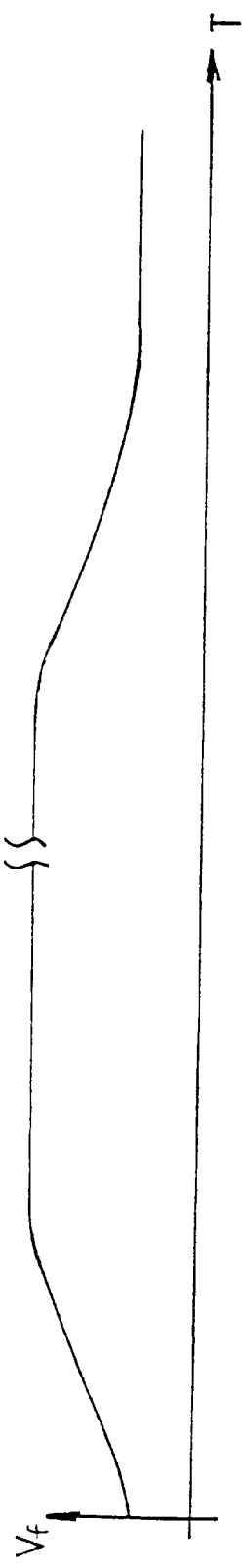

Referring to FIGS. 5 and 6, when the frequency of an external pulse control signal is greater than the frequency of the signal detected from the fan 80, namely, the fan operates at a lower speed, after comparing the two signal frequencies by the frequency comparator 50, the frequency inputted to the negative terminal of the differential integrating circuit 60 is greater than that inputted to the positive terminal of the differential integrating circuit 60. As a result, the differential integrating circuit 60 will output a low voltage to the negative terminal of the differential amplifier 70. A difference between the low voltage at the negative terminal of the differential amplifier 70 and a partial voltage of the power source Vcc at the positive terminal of the differential amplifier 70 is calculated to output a voltage Vf that increases linearly and smoothly, as illustrated in left portions of FIGS. 6A, 6B, and 6C.

When the frequency of the external pulse control signal is smaller than the frequency of the signal detected from the fan 80, namely, the fan operates at a higher speed, after comparing the two signal frequencies by the frequency comparator 50, the frequency inputted to the positive terminal of the differential integrating circuit 60 is greater than that inputted to the negative terminal of the differential integrating circuit 60. As a result, the differential integrating circuit 60 will output a high voltage to the negative terminal of the differential amplifier 70. A difference between the low voltage at the negative terminal of the differential amplifier 70 and a partial voltage of the power source Vcc at the positive terminal of the differential amplifier 70 is calculated to output a voltage Vf that decreases linearly and smoothly, as illustrated in right portions of FIGS. 6A, 6B, and 6C.

Thus, regardless of high speed or low speed of the fan, the voltage Vf inputted to the fan 80 increases or decreases gradually and linearly such that the fan speed that increases or decreases gradually. In addition, the fan 80 is kept at a constant speed.

Conclusively, a fan motor with variable frequency/constant speed control in accordance with the present invention comprises a frequency comparator, a differential integrating circuit, and a differential amplifier. The frequency comparator calculates a frequency difference between a frequency of an external pulse signal input and a frequency of a speed signal detected from the fan. The differential integrating circuit converts the frequency difference into a voltage signal which is inputted to a negative terminal of the differential amplifier. A predetermined voltage is connected to a positive terminal of the differential amplifier. A voltage value at the negative terminal of the differential amplifier is compared with a voltage value at the positive terminal of the differential amplifier to thereby change a voltage outputted to an input end of the fan. The voltage Vf outputted to the fan has a smooth, linear waveform to save electricity and precisely keep the fan at a constant speed, thereby lengthening longevity of the fan.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A fan motor with variable frequency/constant speed control, the fan motor comprising:

a fan having a drive circuit, a pulse signal input, a frequency comparator, a differential integrating circuit, and a differential amplifier, the frequency comparator calculating a frequency difference between a frequency of the pulse signal input and a frequency of a speed signal detected by the drive circuit of the fan, the differential integrating circuit converting the frequency difference into a voltage signal which is inputted to a negative terminal of the differential amplifier, a predetermined voltage being connected to a positive terminal of the differential amplifier, a voltage value at the negative terminal of the differential amplifier being compared with a voltage value at the positive terminal of the differential amplifier to thereby change a voltage outputted to an input end of the fan.

2. The fan motor with variable frequency/constant speed control as claimed in claim 1, wherein the frequency comparator comprises two flip-flops and a reverse AND gate.

3. The fan motor with variable frequency/constant speed control as claimed in claim 1, wherein the differential integrating circuit comprises two resistors, a capacitor, and a comparator.

4. The fan motor with variable frequency/constant speed control as claimed in claim 1, wherein the frequency of the pulse signal input is capable of controlling the speed of the fan.

5. The fan motor with variable frequency/constant speed control as claimed in claim 1, wherein the voltage outputted by the differential amplifier has a smooth, linear waveform.

* * * * *